(12) United States Patent
Jagannath et al.

(10) Patent No.: US 10,140,530 B1
(45) Date of Patent: Nov. 27, 2018

(54) METHOD AND DEVICE FOR IDENTIFYING PATH BOUNDARY FOR VEHICLE NAVIGATION

(71) Applicant: WIPRO LIMITED, Bangalore (IN)

(72) Inventors: Sujatha Jagannath, Bangalore (IN); Ranjith Rochan Meganathan, Ooty (IN)

(73) Assignee: WIPRO LIMITED, Bangalor (IN)

( * ) Notice: Subject to any disclaimer, the term of this patent is extended or adjusted under 35 U.S.C. 154(b) by 0 days.

(21) Appl. No.: 15/713,875

(22) Filed: Sep. 25, 2017

(30) Foreign Application Priority Data

Aug. 9, 2017 (IN) .............................. 201741028343

(51) Int. Cl.
*G06K 9/00* (2006.01)
*G05D 1/02* (2006.01)
(Continued)

(52) U.S. Cl.
CPC .......... *G06K 9/00798* (2013.01); *B60R 11/04* (2013.01); *G05D 1/0246* (2013.01);
(Continued)

(58) Field of Classification Search
CPC . G06T 7/12; G06T 2207/30256; B60R 11/04; B60R 2300/105; G05D 1/0246;
(Continued)

(56) References Cited

U.S. PATENT DOCUMENTS 8,699,754 B2 * 4/2014 Zhang ............... G06K 9/00798
348/116
9,826,200 B2 * 11/2017 Stein .................. G06K 9/00805
(Continued)

FOREIGN PATENT DOCUMENTS

KR 10-2016-0126254 11/2016
WO WO 98/19281 5/1998

OTHER PUBLICATIONS

Deb, K. et el., "Cast Shadow Detection and Removal of Moving Objects from Video Based on HSV Color Space", *Smart Computing Review*; Feb. 2015, vol. 5, No. 1, pp. 38-50.

*Primary Examiner* — Shefali D Goradia
(74) *Attorney, Agent, or Firm* — Finnegan, Henderson, Farabow, Garrett & Dunner, LLP (57) ABSTRACT

Method and device for identifying path boundary for vehicle navigation are disclosed. The method includes capturing a plurality of images of a path being traversed by a vehicle, through a plurality of cameras placed to meet predefined placement criteria. The method further includes processing shadowed regions within each of the plurality of images based on an associated Hue Saturation and Value (HSV) color space to generate a plurality of shadow processed images. The method includes identifying boundaries of the path within each of the plurality of shadow processed images based on a histogram of each of the plurality of shadow processed images. The method further includes estimating a distance between the boundaries of the path identified in the plurality of shadow processed images, based on a disparity map created for the plurality of shadow processed images and parameters associated with the plurality of cameras.

20 Claims, 9 Drawing Sheets

(51) Int. Cl.
  *B60R 11/04* (2006.01)
  *G06K 9/46* (2006.01)
  *G06T 7/12* (2017.01)

(52) U.S. Cl.
  CPC ......... *G06K 9/4633* (2013.01); *G06K 9/4652* (2013.01); *G06T 7/12* (2017.01); *B60R 2300/105* (2013.01); *G06T 2207/30256* (2013.01)

(58) Field of Classification Search
  CPC . G06K 9/4633; G06K 9/4652; G06K 9/00798
  See application file for complete search history.

(56) References Cited

U.S. PATENT DOCUMENTS

| | | |
|---|---|---|
| 2002/0031242 A1 | 3/2002 | Yasui et al. |
| 2009/0034799 A1 | 2/2009 | Nishida et al. |
| 2010/0086174 A1 | 4/2010 | Kmiecik et al. |
| 2013/0141520 A1 | 6/2013 | Zhang et al. |
| 2014/0185879 A1 | 7/2014 | Sohn et al. |
| 2015/0103159 A1 | 4/2015 | Shashua et al. |
| 2015/0317526 A1 | 11/2015 | Muramatsu et al. |
| 2016/0107689 A1 | 4/2016 | Lee |
| 2016/0171314 A1 | 6/2016 | Shao |
| 2018/0101177 A1* | 4/2018 | Cohen .................. G05D 1/0246 |

* cited by examiner

FIG. 8

METHOD AND DEVICE FOR IDENTIFYING PATH BOUNDARY FOR VEHICLE NAVIGATION

TECHNICAL FIELD

This disclosure relates generally to autonomous vehicles and more particularly to method and device for identifying path boundary for vehicle navigation.

BACKGROUND

For smooth navigation of unmanned or autonomous vehicles, an autonomous vehicle control should be robust enough to enable the autonomous vehicle to navigate under the influence of any type of external conditions. These external conditions, for example, include lighting conditions, unstructured roads, road blockages, obstacles (temporary or permanent), environmental or weather changes, or variation in geographic location. Moreover, these external conditions may also vary unexpectedly. The autonomous vehicle should be able to adapt its navigation in order to accommodate these varying external conditions, so as to overcome any unforeseen situation that may lead to accidents or breakdown of the autonomous vehicle.

Conventional systems fail to accurately capture road conditions and external conditions discussed above. As a result, these conventional systems also fail to accurately identify road boundaries. There is therefore a need for a robust method and device that address above problems and enable smooth navigation of autonomous vehicles.

SUMMARY

In one embodiment, a method for identifying path boundary for vehicle navigation is disclosed. The method includes capturing, by a vehicle navigation device, a plurality of images of a path being traversed by a vehicle, through a plurality of cameras placed to meet predefined placement criteria. The method further includes processing, by the vehicle navigation device, shadowed regions within each of the plurality of images based on an associated Hue Saturation and Value (HSV) color space to generate a plurality of shadow processed images. The method includes identifying, by the vehicle navigation device, boundaries of the path within each of the plurality of shadow processed images based on a histogram of each of the plurality of shadow processed images. The method further includes estimating, by the vehicle navigation device, a distance between the boundaries of the path identified in the plurality of shadow processed images, based on a disparity map created for the plurality of shadow processed images and parameters associated with the plurality of cameras.

In another embodiment, a vehicle navigation device for identifying path boundary is disclosed. The vehicle navigation device includes a plurality of cameras, wherein placement of the plurality of cameras satisfies predefined placement criteria. The vehicle navigation device further includes a processor communicatively coupled to the plurality of cameras. The vehicle navigation device includes a memory communicatively coupled to the processor and having instructions stored thereon, causing the processor, on execution to capture a plurality of images of a path being traversed by a vehicle through the plurality of cameras; process shadowed regions within each of the plurality of images based on an associated Hue Saturation and Value (HSV) color space to generate a plurality of shadow processed images; identify boundaries of the path within each of the plurality of shadow processed images based on a histogram of each of the plurality of shadow processed images; and estimate a distance between the boundaries of the path identified in the plurality of shadow processed images, based on a disparity map created for the plurality of shadow processed images and parameters associated with the plurality of cameras.

In yet another embodiment, a non-transitory computer-readable storage medium is disclosed. The non-transitory computer-readable storage medium has instructions stored thereon, causing a vehicle navigation device that includes one or more processors to perform steps including capturing a plurality of images of a path being traversed by a vehicle, through a plurality of cameras placed to meet predefined placement criteria. The steps further include processing shadowed regions within each of the plurality of images based on an associated Hue Saturation and Value (HSV) color space to generate a plurality of shadow processed images. The steps include identifying boundaries of the path within each of the plurality of shadow processed images based on a histogram of each of the plurality of shadow processed images. The steps further include estimating a distance between the boundaries of the path identified in the plurality of shadow processed images, based on a disparity map created for the plurality of shadow processed images and parameters associated with the plurality of cameras.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
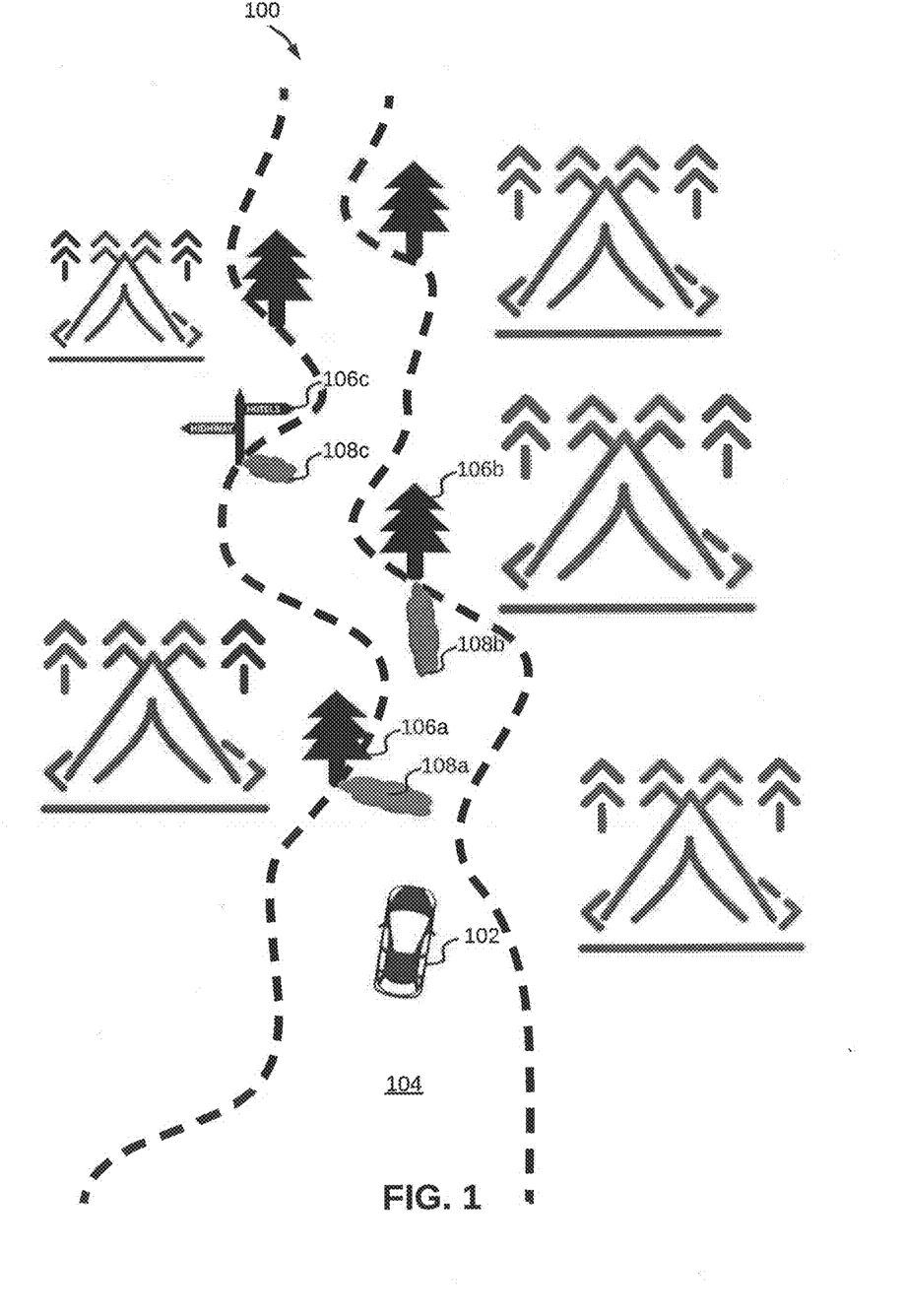
FIG. 1 illustrates an environment in which various embodiments may be employed.

Additional illustrative embodiments are listed below. In one embodiment, FIG. 1 illustrates an exemplary environment 100 in which various embodiments may be employed. Environment 100 includes a vehicle 102 that is traversing on a path 104. Vehicle 102 may be an unmanned, an autonomous, or a semi-autonomous vehicle and examples of vehicle 102, may include, but are not limited to car, bus, truck, van, or a two-wheeler. Path 104 may be a paved road, an unpaved road, or a rough and uneven trail. As is apparent from FIG. 0.1, boundaries of path 104 are not perfectly linear and consistent. Additionally, there are significant variations in the distance between boundaries of path 104 from one point to the other along path 104. As a result, vehicle 102, which is autonomous, is not able to accurately determine the navigable portion on path 104, which may lead to accidents or breakdown of vehicle 102. This accuracy is further impacted because of other external conditions, for example, lighting, weather, variation in geographic location, and shadows. By way of an example, a tree 106a may cast a shadow 108a, a tree 106b may cast a shadow 108b, and a sign board 106c may cast a shadow 108c on path 104. The shadows 108a to 108c may be interpreted as non-navigable portions of path 104 by vehicle 102, thereby impacting smooth navigation of vehicle 102 on path 104. A vehicle navigation device 200 illustrated in FIG. 2, enables accurate identification of boundary of path 102 irrespective of the above discussed conditions.

Figure 2:
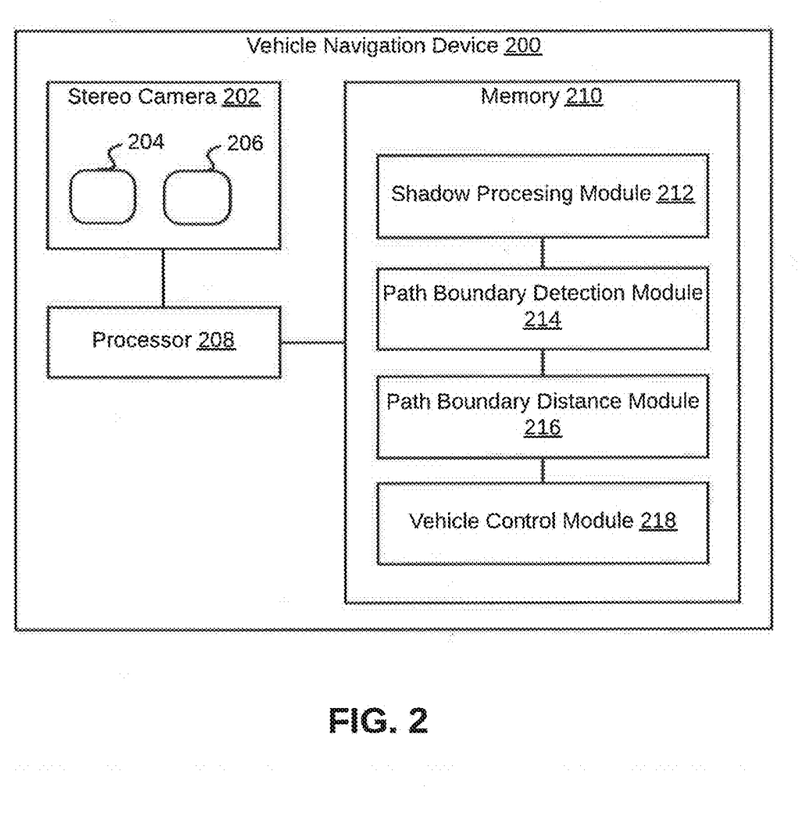
FIG. 2 is a block diagram illustrating various components within a vehicle navigation device, in accordance with an embodiment

Referring now to FIG. 2, a block diagram of various components within vehicle navigation device 200 is illustrated, in accordance with an embodiment. Vehicle navigation device 200 may be implemented as a variety of portable computing device, such a smartphone, a dedicated handheld device, a tablet, or a phablet. Alternatively, vehicle navigation device 200 may be implemented as a distributed system, such that, few components of vehicle navigation device 200 reside in a portable device, while, other components may reside in a server, which may be located remotely or within a vehicle.

Vehicle navigation device 200 includes a stereo camera 202, which further includes a plurality of cameras (for example, a camera 204 and a camera 206). It will be apparent to a person skilled in the art that stereo camera 202 may include more than two cameras Vehicle navigation device 200 further includes a processor 208 communicatively coupled to stereo camera 202 and a memory 210 communicatively coupled to processor 208. Memory 210 has processor instructions stored thereon, which on execution cause processor 208 to identify path boundary. Memory 210 includes instructions stored thereon, that cause processor 208, on execution to generate the distortion free image. Memory 210 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM).

Each of the plurality of cameras is placed on the front side of the vehicle, in order to capture the path region ahead of the vehicle. Additionally, each of the plurality of cameras is placed in order to meet predefined placement criteria. One of the predefined placement criteria is that each of the plurality of cameras should be placed in same horizontal plane. Another predefined placement criterion is that optical axis of each of the plurality of cameras should be placed parallel to each other. While the vehicle is navigating on a path, the plurality of cameras captures a plurality of images from different angles.

Each of the plurality of images is captured in the Red Green Blue (RGB) color space. A shadow processing module 212 in memory 210 first converts each of the plurality of images from the RGB color space to Hue Saturation and Value (HSV) color space. Thereafter, shadow processing module 212 processes shadowed regions within each of the plurality of Images based on an associated HSV color space to generate a plurality of shadow processed images. This is further explained in detail in conjunction with FIG. 3 and FIG. 4.

Thereafter, a path boundary detection module 214 in memory 210 identifies boundaries of the path within each of the plurality of shadow processed images, based on a histogram of each of the plurality of shadow processed images. To this end, each of the plurality of shadow processed images is first converted to grayscale and then a histogram of a shadow processed image is plotted. This is further explained in detail in conjunction with FIG. 3 and FIG. 5.

Once the boundaries of the path are identified in each of the plurality of shadow processed images, a path boundary distance module 216 estimates a distance between the boundaries. The distance between the boundaries may be identified based on a disparity map created for the plurality of shadow processed images and parameters associated with the plurality of cameras. This is further explained in detail in conjunction with FIG. 3 and FIG. 6. Based on the distance estimated between the boundaries of the path, a vehicle control module 218 in memory 210 computes navigation coordinates for the vehicle on the path. The navigation coordinates may be computed using identified boundaries of the path and other path detection parameters determined in the above steps. This is further explained in detail in conjunction with FIG. 3.

Figure 3:
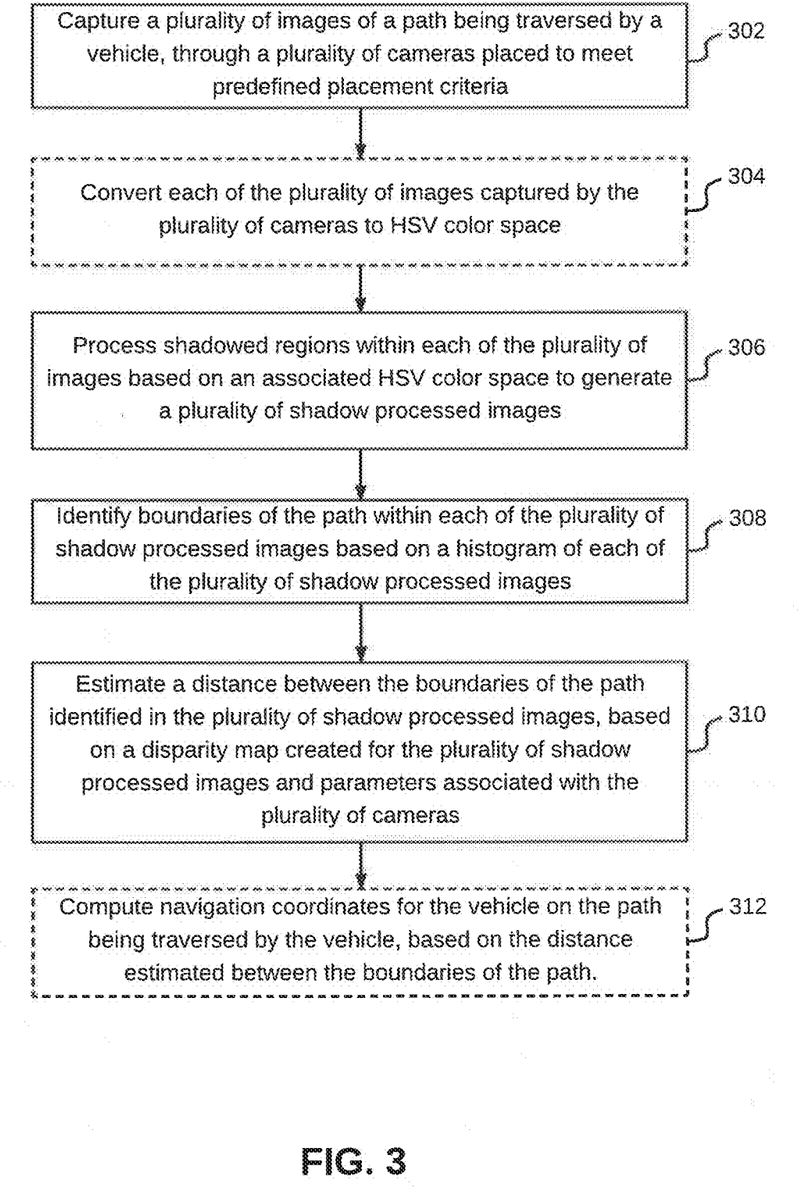
FIG. 3 illustrates a flowchart of a method for identifying path boundary for vehicle navigation, in accordance with an embodiment.

Referring now to FIG. 3, a flowchart of a method for identifying path boundary for vehicle navigation is illustrated, in accordance with an embodiment. At step 302, vehicle navigation device 200 captures a plurality of images of a path being traversed by a vehicle through the plurality of cameras. Each of the plurality of cameras is placed on the front side of the vehicle, in order to capture the path region ahead of the vehicle. Additionally, each of the plurality of cameras is placed in order to meet predefined placement criteria are met. One of the predefined placement criteria is that each of the plurality of cameras should be placed in same horizontal plane. Another predefined placement criterion is that optical axis of each of the plurality of cameras should be placed parallel to each other.

Before capturing the plurality of images, one or more parameters associated with the plurality of cameras are obtained. One of the parameters is the baseline distance, which is the separation distance between two adjacent cameras in the plurality of cameras. The baseline distance may be estimated at the time of placing the plurality of cameras on the vehicle. In addition to the baseline distance, Field Of View (FOV) and image width in pixels is also determined for each of the plurality of cameras. The one or more parameters are used to determine distance from a disparity map created for the plurality of images captured by the plurality of cameras. This is further explained in detail below at step 310.

Each of the plurality of images is captured in the RGB color space. Vehicle navigation device 200 converts each of the plurality of images from the RGB color space to HSV color space at step 304. The HSV color space may also be termed as Hue Saturation and Luminosity (HSL) color space.

At step 306, vehicle navigation device 200 processes shadowed regions within each of the plurality of images based on an associated HSV color space to generate a plurality of shadow processed images. As discussed in FIG. 1, these shadows may be casted on the path as a result of permanent or temporary objects along the boundaries of the path. Shadows in each of the plurality of images may be processed using chromatic conditions in the associated HSV color space. An image with shadows may have greater color range in the V channel of the associated HSV color space. This property may be used to estimate the amount of lightness the image may have gathered with respect to the saturation and hue conditions. The processing of shadows may be done at the pixel level. This is further explained in detail in conjunction with FIG. 4.

Based on a histogram of each of the plurality of shadow processed images, vehicle navigation device 200 identifies boundaries of the path within each of the plurality of shadow processed images at step 308. To this end, each of the plurality of shadow processed images is first converted to gray scale and then a histogram of an image is plotted. This is further explained in detail in conjunction with FIG. 5.

Once the boundaries of the path are identified in each of the plurality of shadow processed images, vehicle navigation device 200, at step 310, estimates a distance between the boundaries. The distance between the boundaries may be identified based on a disparity map created for the plurality of shadow processed images and parameters associated with the plurality of cameras. The parameters may include, but are not limited to the baseline distance between two adjacent cameras, FOV of each of the plurality of cameras, and image width in pixels for each of the plurality of cameras.

In an exemplary embodiment, the distance between the boundaries is computed using the equations 1 and 2 given below:

$$\text{Distance}=(\text{Focal Pixel}*\text{Baseline Distance})/\text{Disparity} \quad (1)$$

$$\text{Focal Pixel}=(\text{Image width in pixels}*0.5)/\tan(\text{FOV}*0.5) \quad (2)$$

where,

Focal Pixel is the focal length of a camera

Figure 6:
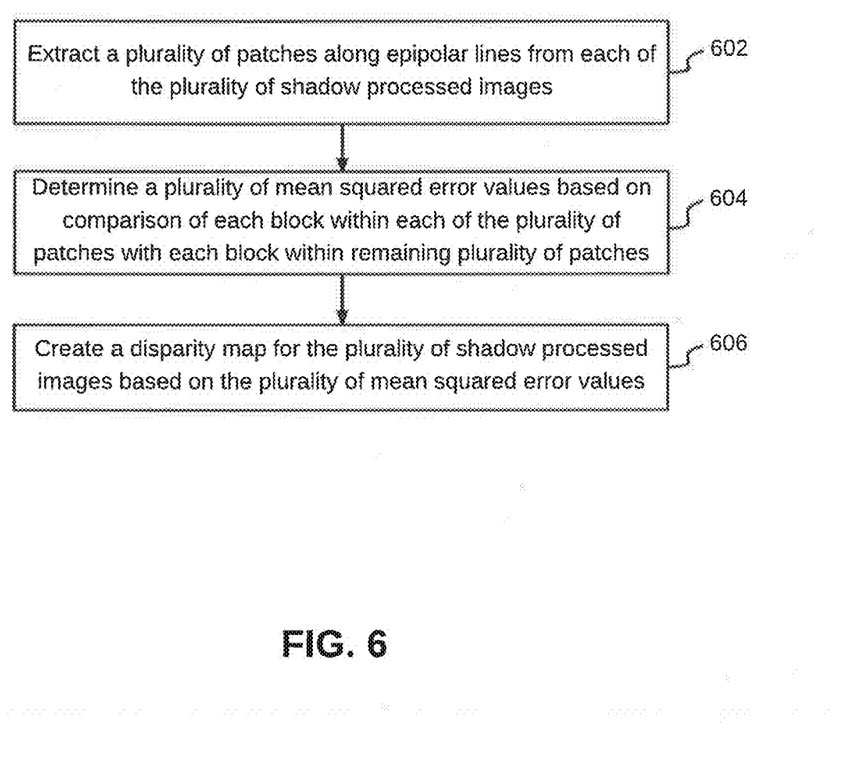
FIG. 6 illustrates a flowchart of a method for estimating distance between boundaries of a path being traversed by a vehicle, in accordance with an embodiment.

Estimation of distance between boundaries of the path is further explained in detail in conjunction with FIG. 6. Based on the distance estimated between the boundaries of the path, vehicle navigation device 200 computes navigation coordinates for the vehicle on the path at step 312. The navigation coordinates may be computed using the identified boundaries of the path and other path detection parameters determined in the above steps. Additionally, the current position of the vehicle with respect to the path is also taken into consideration to compute the navigation coordinates. The complete process of identifying boundaries of a path for navigation of the vehicle is illustrated in conjunction with an exemplary embodiment given in FIGS. 7A and 7B.

Figure 4:
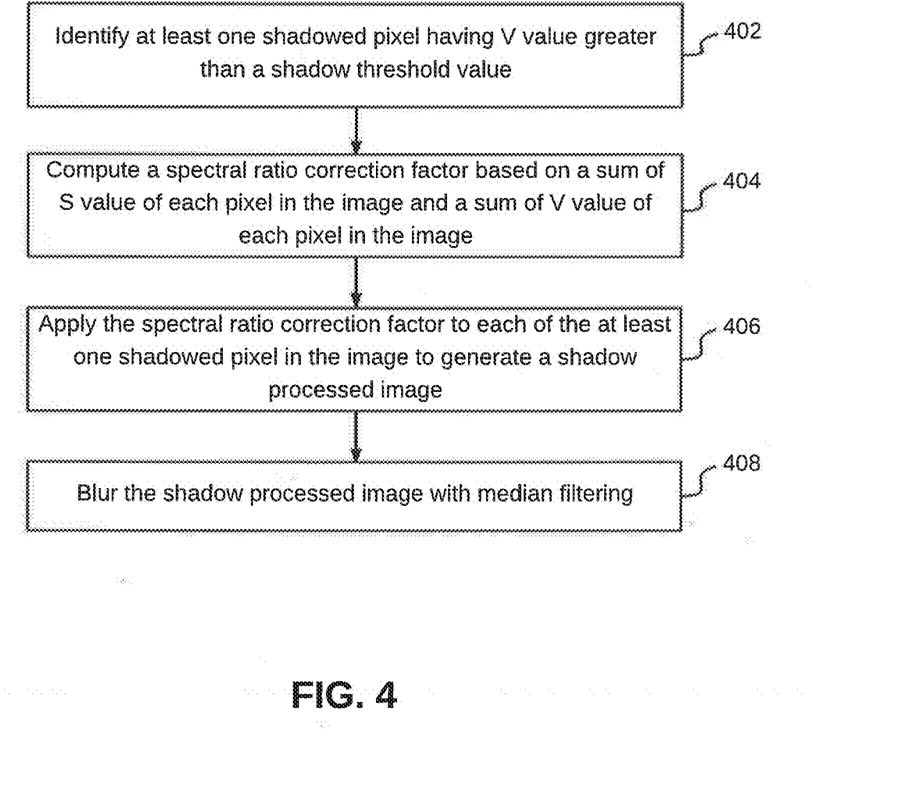
FIG. 4 illustrates a flowchart of a method for processing shadowed region in an image a path captured by a camera installed on a vehicle, in accordance with an embodiment.

Referring now to FIG. 4, a flowchart of a method for processing shadowed region in an image of a path captured by a camera installed on a vehicle is illustrated, in accordance with an embodiment. The image may be captured in the RGB color space and may be later converted into an HSV color space. Thereafter, at step 402, one or more shadowed pixels in the image that have V value greater than a shadow threshold value are identified. The shadow threshold value may be fixed by an administrator and may be automatically adjusted based on conditions in which the image was captured.

Once the one or more shadowed pixels have been identified, at step 404, a spectral ratio correction factor Is computed based on a sum of S value (in the HSV color space) of each pixel in the image and a sum of V value (in the HSV color space) of each pixel in the image. In an embodiment, the spectral ratio correction factor may be computed using the equation 3:

$$\text{Spectral Ratio Correction Factor}=(\Sigma S/\Sigma V) \quad (3)$$

where, $\Sigma S$ is the sum of S value of each pixel in the image, $\Sigma V$ is the sum of V value of each pixel in the image.

At step 406, the spectral ratio correction factor is applied to each of the one or more shadowed pixel in the image. This results in generation of a shadow processed image from the image. The spectral ratio correction factor is used as gamma correction ratio and is applied to the one or more shadowed pixels with shadow processing features. Features in images may vary based on brightness, thus appropriate correction is done for each shadow processed feature.

Thereafter, at step 408, the shadow processed image is blurred with median filtering in order to reduce noise. It will be apparent to a person skilled in the art that steps 402 to 408 are performed independently for each of the plurality of images captured by the plurality of cameras. This ensures that the effect of external conditions on an image is retained as such and the effect of lighting and other condition on one image doesn't affect other images. In other words, the plurality of images is processed to generate a plurality of shadow processed images.

Figure 5:
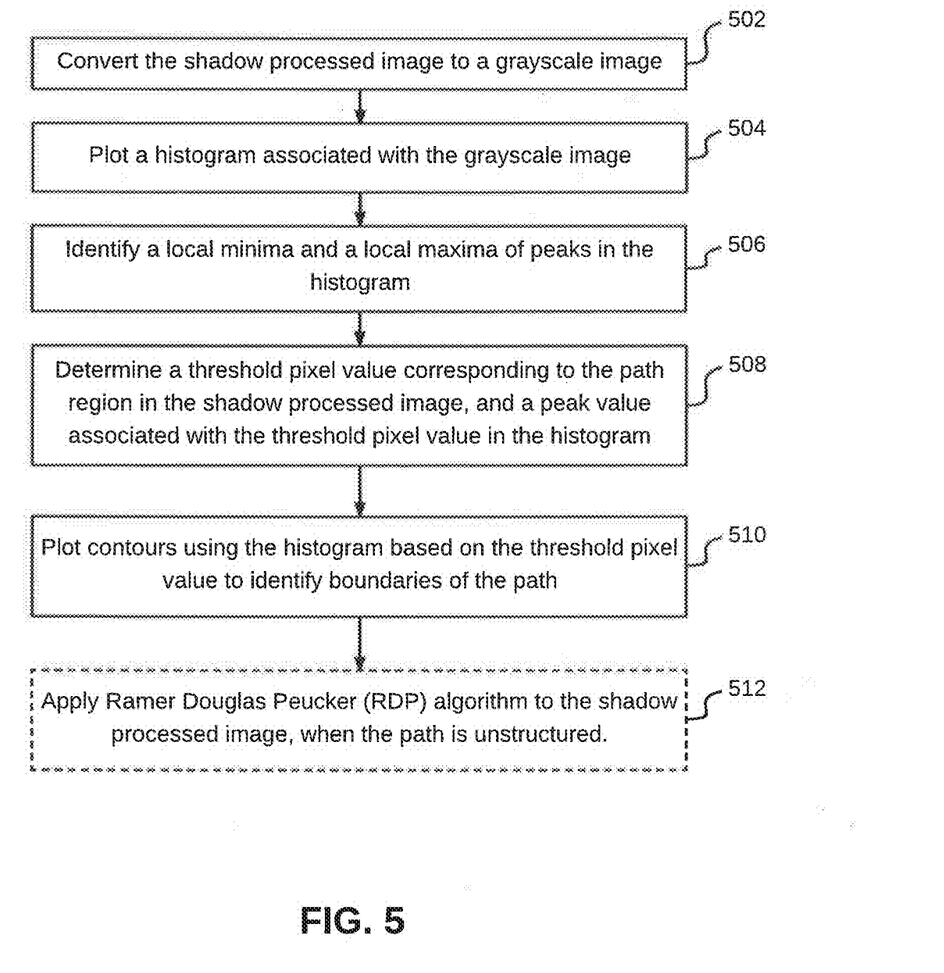
FIG. 5 illustrates a flowchart of a method for identifying boundaries of a path within a shadow processed image, in accordance with an embodiment.

Referring now to FIG. 5, a flowchart of a method for identifying boundaries of a path within a shadow processed image is illustrated, in accordance with an embodiment. At step 502, the shadow processed image is converted to a grayscale image. The grayscale image is then used to plot a histogram at step 504. The histogram plots the number of pixels for different intensity values in the grayscale image. Thereafter, at step 506, a local minima and a local maxima of peaks in the histogram are identified.

At step 508, a threshold pixel value corresponding to a path region in the shadow processed image is determined. The threshold pixel value represents the intensity. Additionally, at step 508, a peak value associated with the threshold pixel value in the histogram is also determined. The peak value represents the number of pixels corresponding to the intensity (or the threshold pixel value). The threshold pixel value is the optimum threshold value for the image to extract the path region. Based on the threshold pixel value, boundaries of the path are identified by plotting contours using the histogram, at step 510. While plotting the contours, boundaries with maximum length are considered for extraction of boundary of the path.

When the path is unstructured, perfect smooth boundary lines may not be identified. In this case, at step 512, Ramer Douglas Peucker (RDP) smoothening algorithm is applied to the shadow processed image. The RDP smoothening algorithm is used to make irregular shapes into a standard known geometry. As a result, when RDP smoothening algorithm is applied to the shadow processed image, the boundaries of path are more efficiently and accurately detected. In an embodiment, once edges of the boundaries are processed, the morphological operations are done to achieve noise free contours and canny edges are taken to plot Hough lines in order to clearly identify boundary lines. It will be apparent to a person skilled in the art that steps 502 to 512 are performed independently for each of the plurality of shadow processed images.

Referring now to FIG. 6, a flowchart of a method for estimating distance between boundaries of a path being traversed by a vehicle is illustrated, in accordance with an embodiment. After boundaries of the path have been identified in each of the plurality of shadow processed images, a plurality of patches along epipolar lines are extracted from each of the plurality of shadow processed images at step 602. By way of an example, when two cameras are installed on the vehicle, two horizontal patches from the shadow processed images associated with both the cameras are extracted.

Once the plurality of patches are extracted, each block within each of the plurality of patches is compared with each block within remaining plurality of patches in order to determine a plurality of mean squared error values at step 604. In continuation of the example above, when only two images are captured, one block of a patch extracted from a first image (left image) is compared with all the blocks in a corresponding patch extracted from a second image (right image) to determine a MSE value.

The plurality of mean squared error values are then used to create a disparity map for the plurality of shadow processed images at step 606. To this end, a mean squared error value that has the minimum error is considered as the optimum candidate and the pixel index for both the images are subtracted to create the disparity map. The disparity value from the disparity map, along with focal length of the camera in pixels, image width in pixels, and baseline distance between the cameras are used to estimate the distance between the boundaries of the path. This has been explained in detail in conjunction with equation 1 and 2 given in FIG. 3.

Figure 7A:
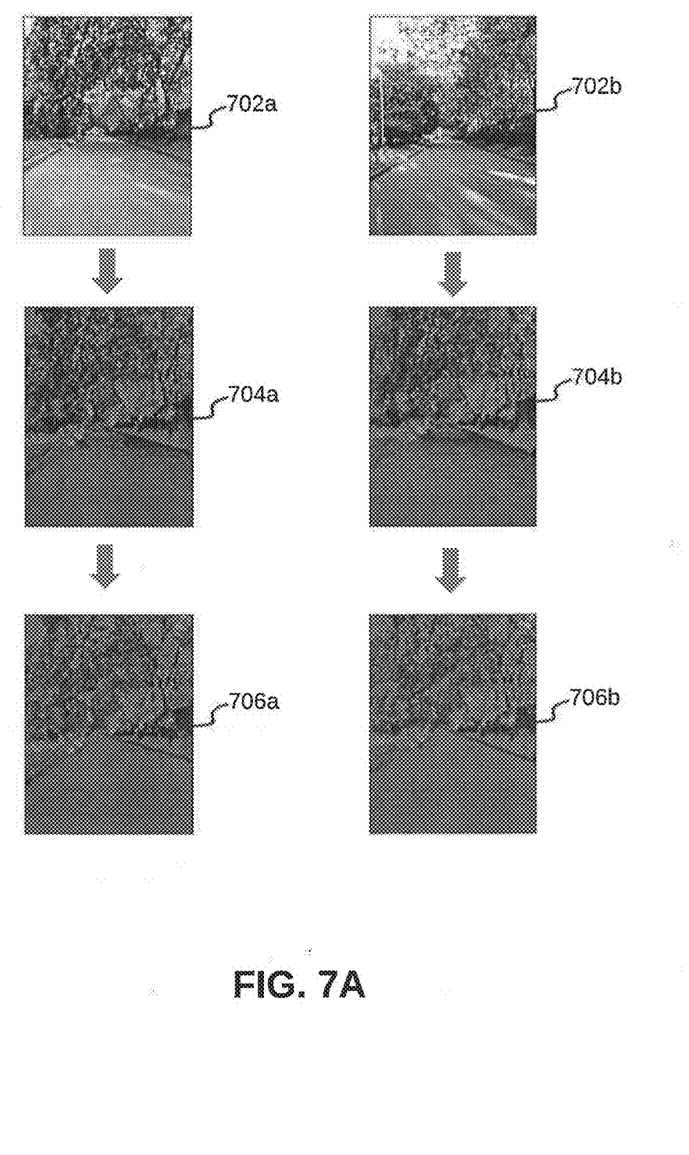
FIGS. 7A and 7B illustrates identification of boundaries of a road for navigation of a vehicle, in accordance with an exemplary embodiment.
Figure 7B:
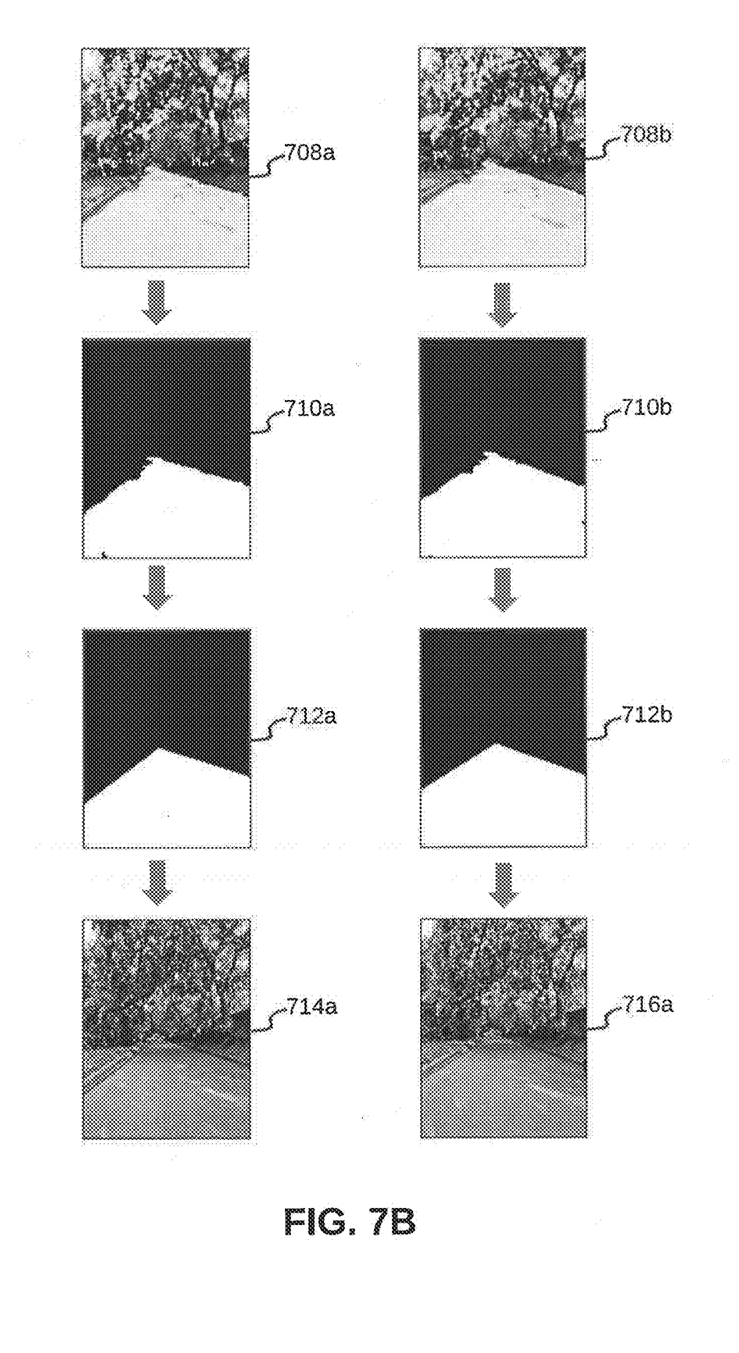

Referring now to FIGS. 7A and 7B, identification of boundaries of a road for navigation of a vehicle is illustrated, in accordance with an exemplary embodiment. In this exemplary embodiment, the vehicle has a stereo camera installed in the front that includes two cameras, for example, camera 204 and camera 206. Cameras 204 and 206 are used to capture two images, i.e., an image 702a and an image 702b, in RGB color space. Both images 702a and 702b are converted from the RGB color space to an HSV color space to generate images 704a and 704b.

Shadowed regions in images 704a and 704b are then processed using the method disclosed in FIG. 4 to respectively generate a shadow processed image 706a and a shadow processed image 706b. Shadow processes images 706a and 706b are then converted into grayscale images to respectively generate a grayscale image 708a and a grayscale image 708b.

Using each of greyscale images 708a and 708b, a histogram is separately plotted for each of greyscale image 708a and 708b. A local minima and a local maxima of peaks in each histogram are identified. Thereafter, a threshold pixel value corresponding to a road region in shadow processed images 706a and 706b are separately determined. Additionally, a peak value associated with the threshold pixel value in each histogram is also determined. This is illustrated in an image 710a and an image 710b. The RDP smoothening algorithm is thereafter applied on images 710a and 710b to generate images 712a and 712b. As a result, the boundaries of the road are more accurately detected. The identified boundaries are then mapped on to images 702a and 702b to generate images 714a and 714b for navigation of the vehicle on the road region.

Figure 8:
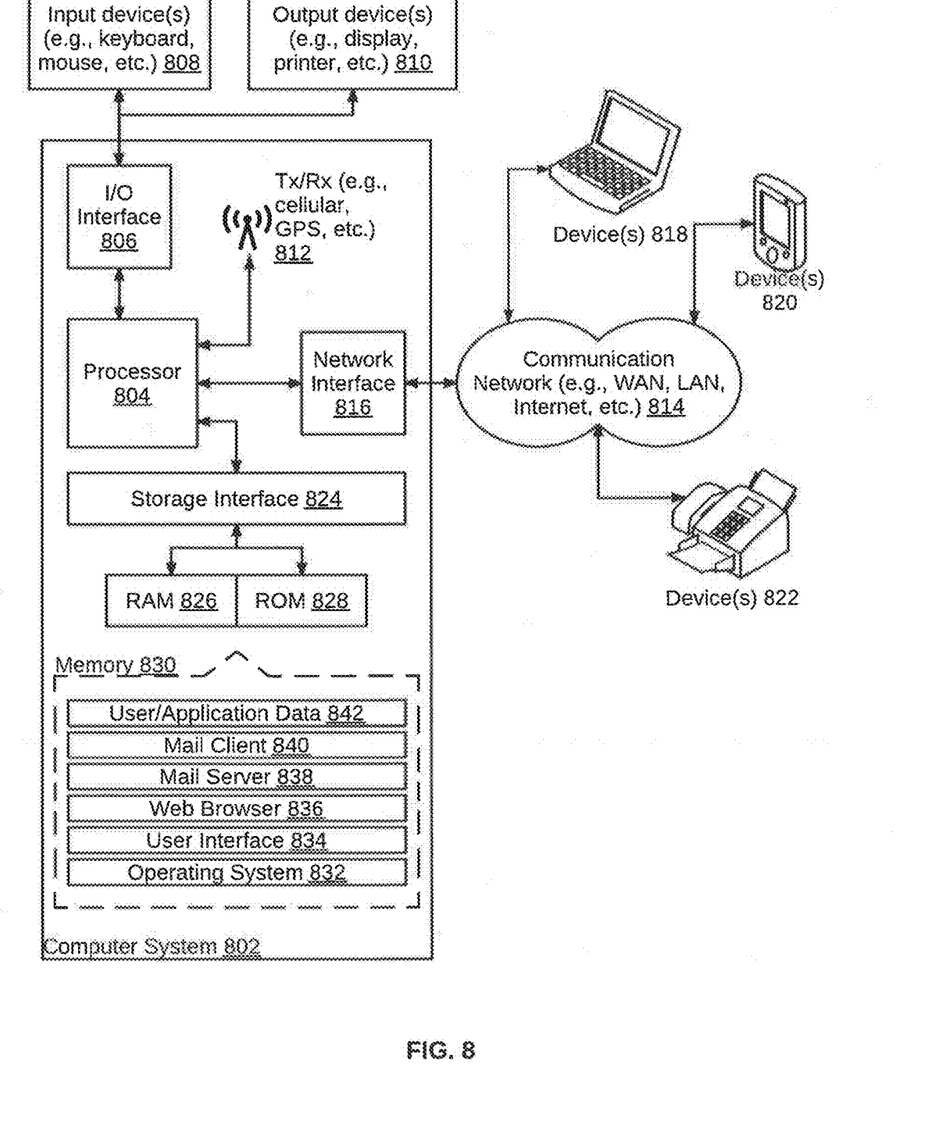
FIG. 8 illustrates a block diagram of an exemplary computer system for implementing various embodiments.

Referring now to FIG. 8, a block diagram of an exemplary computer system for implementing various embodiments is illustrated. Computer system 802 may include a central processing unit ("CPU" or "processor") 804 that includes at least one data processor for executing program components for executing user-generated requests or system-generated requests. A user may include a person, a person using a device such as such as those included in this disclosure, or such a device itself. Processor 804 may include specialized processing units such as integrated system (bus) controllers, memory management control units, floating point units, graphics processing units, digital signal processing units, etc. Processor 804 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 804 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 804 may be disposed in communication with one or more input/output (I/O) devices via an I/O interface 806. I/O interface 806 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 806, computer system 802 may communicate with one or more I/O devices. For example, an input device 808 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 810 may be a printer, fax machine, video display (e.g., cathode ray tube (CRT), liquid crystal display (LCD), light-emitting diode (LED), plasma, or the like), audio speaker, etc. In some embodiments, a transceiver 812 may be disposed in connection with processor 804. Transceiver 812 may facilitate various types of wireless transmission or reception. For example, transceiver 812 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 804 may be disposed in communication with a communication network 814 via a network interface 816. Network interface 816 may communicate with communication network 814. Network interface 816 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 814 may include, without limitation, a direct interconnection, local area network (LAN), wide area network (WAN), wireless network (e.g., using Wireless Application Protocol), the Internet, etc. Using network interface 816 and communication network 814, computer system 802 may communicate with devices 818, 820, and 822. The devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 802 may itself embody one or more of the devices.

In some embodiments, processor 804 may be disposed in communication with one or more memory devices (e.g., RAM 826, ROM 828, etc.) via a storage interface 824. Storage interface 824 may connect to memory 830 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 830 may store a collection of program or database components, including, without limitation, an operating system 832, user interface application 834, web browser 836, mail server 838, mail client 840, user/application data 842 (e.g., any data variables or data records discussed in this disclosure), etc. Operating system 832 may facilitate resource management and operation of computer system 802. Examples of operating systems 832 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 834 may facilitate display, execution, interaction, manipulation, or operation of program components through textual or graphical facilities. For example, user interfaces may provide computer interaction interface elements on a display system operatively connected to computer system 802, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 802 may implement a web browser 836 stored program component. Web browser 836 may be a hypertext viewing application, such as MICROSOFT INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 802 may implement a mail server 838 stored program component. Mail server 838 may be an Internet mail server such as MICROSOFT® EXCHANGE® mail server, or the like. Mail server 838 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 838 may utilize communication protocols such as internet message access protocol (IMAP), messaging application programming interface (MAPI), Microsoft Exchange, post office protocol (POP), simple mail transfer protocol (SMTP), or the like. In some embodiments, computer system 802 may implement a mail client 840 stored program component. Mail client 840 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 802 may store user/application data 842, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for identifying path boundary for vehicle navigation. The device and method work on any path surface and is completely independent of the structure of the path. Even in really bad road conditions or when a road is completely unstructured and has irregular boundaries, the device and method tries to approximate the detected road conditions to a nearest possible regular shape using stereo camera images. This ensure that further image processing for detecting boundary of a road are easier. The method and device, thus, overcomes effects of surrounding environment and external conditions to guide the autonomous vehicle for a smooth navigation. The vehicle can navigate safely independent of any lighting conditions and does not fail even on completely shadowed roads. Further, the device and method, without any modification, can be extended to curved roads and roads with sharp turns.

The specification has described method and device for identifying path boundary for vehicle navigation. The illustrated steps are set out to explain the exemplary embodiments shown, and it should be anticipated that ongoing technological development will change the manner in which particular functions are performed. Examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for identifying path boundary for vehicle navigation, the method comprising:
   capturing, by a vehicle navigation device, a plurality of images of a path being traversed by a vehicle, through a plurality of cameras placed to meet predefined placement criteria;
   processing, by the vehicle navigation device, shadowed regions within each of the plurality of images based on an associated Hue Saturation and Value (HSV) color space to generate a plurality of shadow processed images;
   identifying, by the vehicle navigation device, boundaries of the path within each of the plurality of shadow processed images based on a histogram of each of the plurality of shadow processed images; and
   estimating, by the vehicle navigation device, a distance between the boundaries of the path identified in the plurality of shadow processed images, based on a disparity map created for the plurality of shadow processed images and parameters associated with the plurality of cameras.

2. The method of claim 1, further comprising computing navigation coordinates for the vehicle on the path being traversed by the vehicle, based on the distance estimated between the boundaries of the path.

3. The method of claim 1, wherein the predefined placement criteria comprise at least one of:
   placement of each of the plurality of cameras in same horizontal plane; and
   parallel placement of optical axis of each of the plurality of cameras.

4. The method of claim 1, further comprising converting each of the plurality of images captured by the plurality of cameras to HSV color space.

5. The method of claim 1, wherein processing shadowed region in an image from the plurality of images comprises:
   identifying at least one shadowed pixel having V value greater than a shadow threshold value;
   computing a spectral ratio correction factor based on a sum of S value of each pixel in the image and a sum of V value of each pixel in the image; and
   applying the spectral ratio correction factor to each of the at least one shadowed pixel in the image to generate a shadow processed image.

6. The method of claim 5, wherein processing shadowed region in the image further comprises blurring the shadow processed image with median filtering.

7. The method of claim 1, wherein identifying boundaries of the path within a shadow processed image from the plurality of shadow processed images comprises:
   converting the shadow processed image to a grayscale image;
   plotting a histogram associated with the grayscale image;
   identifying a local minima and a local maxima of peaks in the histogram;
   determining a threshold pixel value corresponding to a path region in the shadow processed image, and a peak value associated with the threshold pixel value in the histogram; and
   plotting contours using the histogram based on the threshold pixel value to identify boundaries of the path.

8. The method of claim 7, wherein identifying boundaries of the path within the shadow processed image further comprises applying Ramer Douglas Peucker (RDP) algorithm to the shadow processed image, when the path is unstructured.

9. The method of claim 8, wherein estimating the distance between the boundaries of the path comprises:
   extracting a plurality of patches along epipolar lines from each of the plurality of shadow processed images;
   determining a plurality of mean squared error values based on comparison of each block within each of the plurality of patches with each block within remaining plurality of patches; and
   creating a disparity map for the plurality of shadow processed images based on the plurality of mean squared error values.

10. The method of claim 1, wherein a stereo camera comprises the plurality of cameras.

11. A vehicle navigation device for identifying path boundary, the vehicle navigation device comprising:

a plurality of cameras, wherein placement of the plurality of cameras satisfies predefined placement criteria;

a processor communicatively coupled to the plurality of cameras; and a memory communicatively coupled to the processor and having processor instructions stored thereon, causing the processor, on execution to:

capture a plurality of images of a path being traversed by a vehicle through the plurality of cameras;

process shadowed regions within each of the plurality of images based on an associated Hue Saturation and Value (HSV) color space to generate a plurality of shadow processed images;

identify boundaries of the path within each of the plurality of shadow processed images based on a histogram of each of the plurality of shadow processed images; and estimate a distance between the boundaries of the path identified in the plurality of shadow processed images, based on a disparity map created for the plurality of shadow processed images and parameters associated with the plurality of cameras.

12. The vehicle navigation device of claim 11, wherein the processor instructions further cause the processor to compute navigation coordinates for the vehicle on the path being traversed by the vehicle, based on the distance estimated between the boundaries of the path.

13. The vehicle navigation device of claim 11, wherein the predefined placement criteria comprise at least one of:

placement of each of the plurality of cameras in same horizontal plane; and parallel placement of optical axis of each of the plurality of cameras.

14. The vehicle navigation device of claim 11, further comprising converting each of the plurality of images captured by the plurality of cameras to HSV color Space.

15. The vehicle navigation device of claim 11, wherein to process shadowed region in an image from the plurality of images, the processor instructions further cause the processor to:

identify at least one shadowed pixel having V value greater than a shadow threshold value;

compute a spectral ratio correction factor based on a sum of S value of each pixel in the image and a sum of V value of each pixel in the image; and apply the spectral ratio correction factor to each of the at least one shadowed pixel in the image to generate a shadow processed image.

16. The vehicle navigation device of claim 15, wherein to process shadowed region in the image, the processor instructions further cause the processor to blur the shadow processed image with median filtering.

17. The vehicle navigation device of claim 11, wherein to identify boundaries of the path within a shadow processed image from the plurality of shadow processed images, the processor instructions further cause the processor to:

convert the shadow processed image to a grayscale image;

plot a histogram associated with the grayscale Image;

identify a local minima and a local maxima of peaks in the histogram;

determine a threshold pixel value corresponding to a path region in the shadow processed image, and a peak value associated with the threshold pixel value in the histogram; and plot contours using the histogram based on the threshold pixel value to identify boundaries of the path.

18. The vehicle navigation device of claim 17, wherein the processor instructions further cause the processor to applying Ramer Douglas Peucker (RDP) algorithm to the shadow processed image, when the path is unstructured.

19. The vehicle navigation device of claim 18, wherein to estimate the distance between the boundaries of the path, the processor instructions further cause the processor to:

extract a plurality of patches along epipolar lines from each of the plurality of shadow processed images;

determine a plurality of mean squared error values based on comparison of each block within each of the plurality of patches with each block within remaining plurality of patches; and create a disparity map for the plurality of shadow processed images based on the plurality of mean squared error values.

20. A non-transitory computer-readable storage medium is disclosed, the non-transitory computer-readable storage medium has instructions stored thereon, causing a vehicle navigation device that includes one or more processors to perform steps including:

capturing a plurality of images of a path being traversed by a vehicle, through a plurality of cameras placed to meet predefined placement criteria;

processing shadowed regions within each of the plurality of images based on an associated Hue Saturation and Value (HSV) color space to generate a plurality of shadow processed images;

identifying boundaries of the path within each of the plurality of shadow processed images based on a histogram of each of the plurality of shadow processed images; and estimating a distance between the boundaries of the path identified in the plurality of shadow processed images, based on a disparity map created for the plurality of shadow processed images and parameters associated with the plurality of cameras.

* * * * *